May 24, 1927.
C. W. GILDEA ET AL
SHOCK ABSORBER
Filed Aug. 17, 1925
1,629,499
2 Sheets-Sheet 2
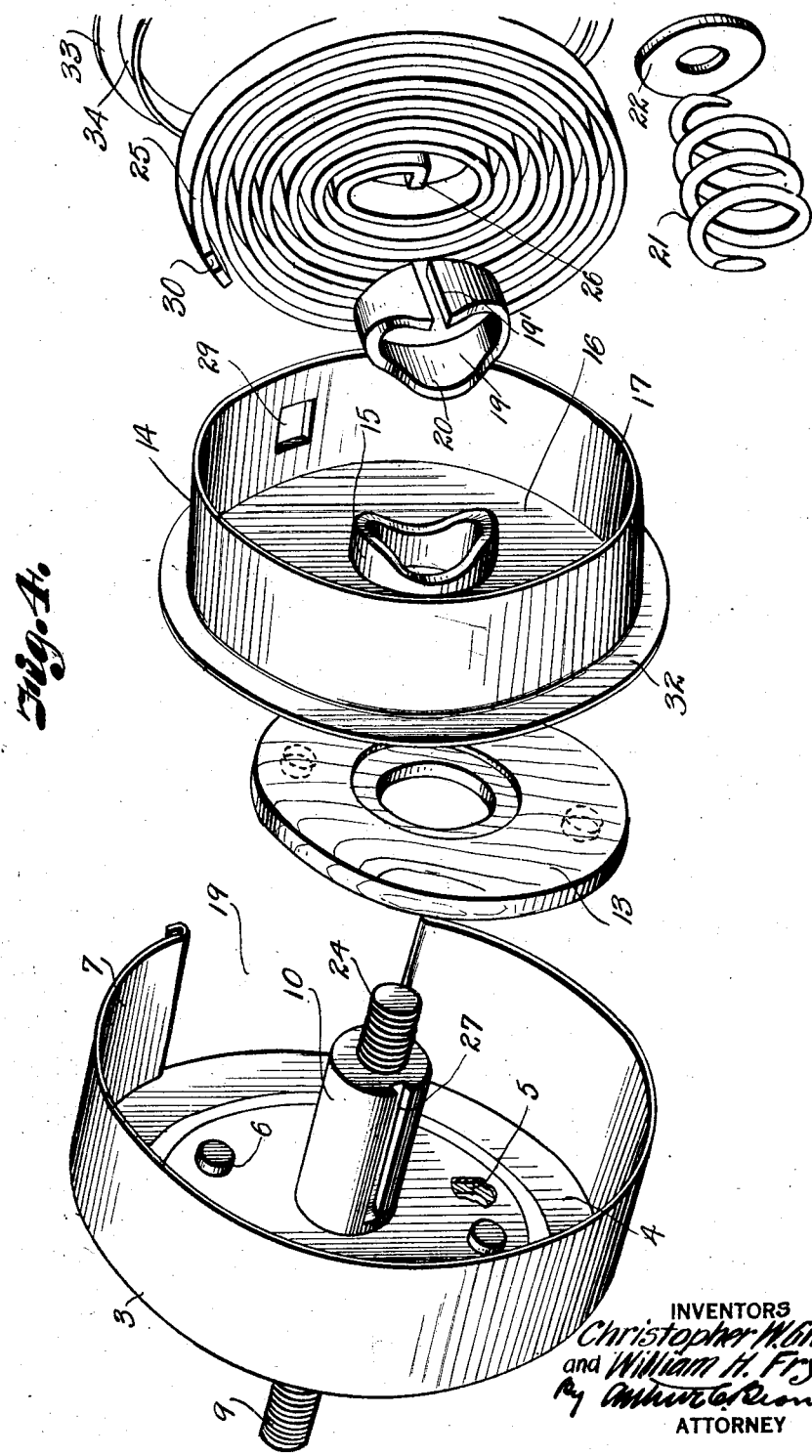
INVENTORS
Christopher W. Gildea
and William H. Fry.
By Arthur C. Brown
ATTORNEY Patented May 24, 1927.

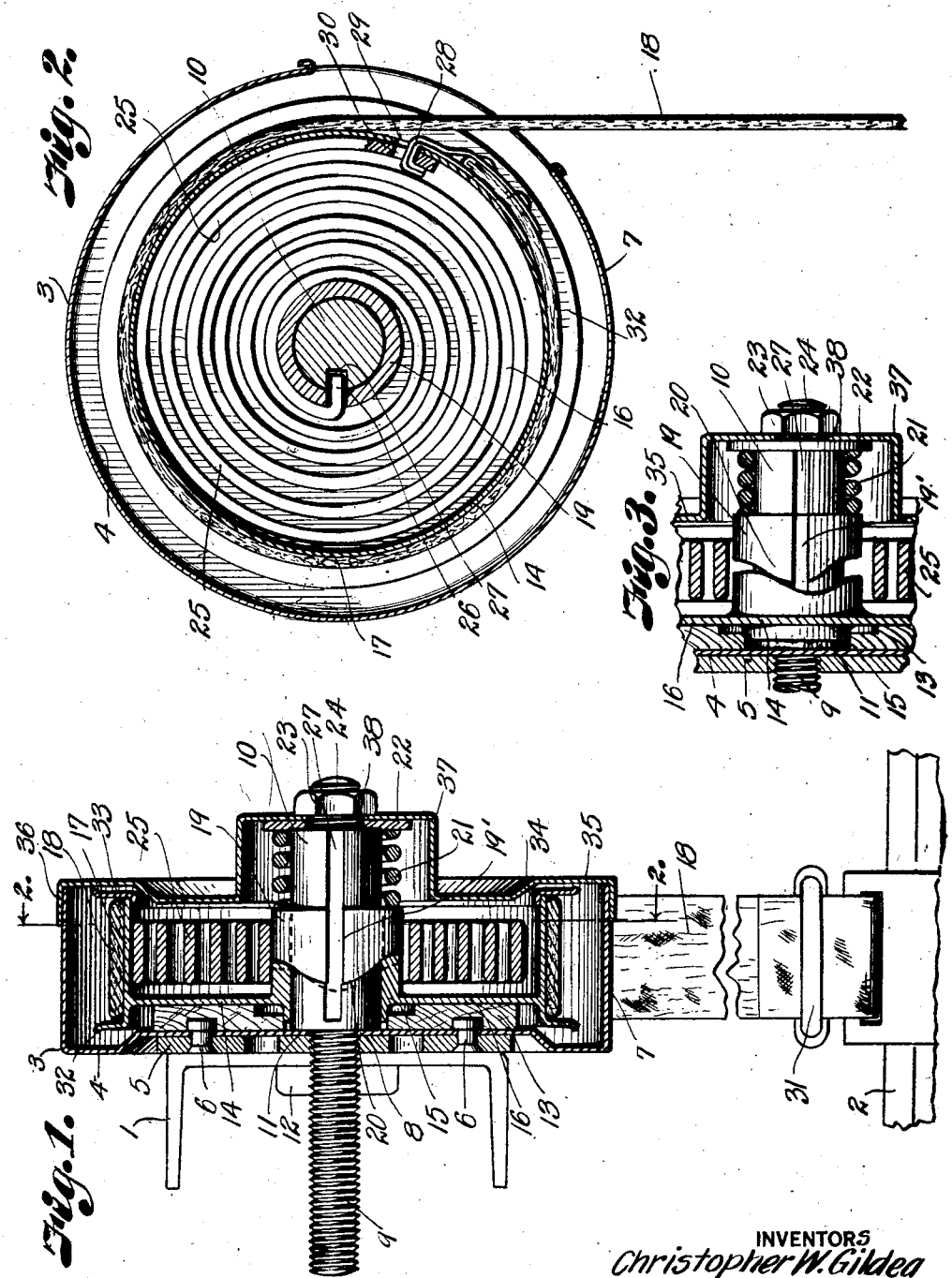

1,629,499

UNITED STATES PATENT OFFICE.

CHRISTOPHER W. GILDEA AND WILLIAM H. FRY, OF KANSAS CITY, MISSOURI; SARAH E. FRY, WIDOW OF, AND BY DECREE OF COURT OWNER OF THE PROPERTY OF, SAID WILLIAM H. FRY, DECEASED.

SHOCK ABSORBER.

Application filed August 17, 1925. Serial No. 50,638.

Our invention relates to shock absorbers and more particularly to a device of that character for cushioning rebound of the springs of a motor vehicle, the invention contemplating employment of the ordinary clock spring check as a recoil for the rebound check band and for absorbing initial force of the rebound shocks, together with an auxiliary absorber which is automatically brought into gradual action as the rebound progresses, the principal object of the invention being to eliminate shocks due to rebound of the vehicle, by gradually absorbing the shocks irrespective of the degree or speed of the rebound.

In accomplishing this object we have provided improved details of structure, the preferred forms of which are shown in the accompanying drawings, wherein Fig. 1 is a shock absorber embodying our improvements and illustrating application of the device to a vehicle frame and axle.

Fig. 2 is a section on the line 2—2 (Fig. 1).

Fig. 3 is a detail section of the hub portion of the device, illustrating position of the cams in substantially their extreme limit of shock absorbing movement.

Fig. 4 is a detail perspective view of the several parts of the device, separated but in relative arrangement.

Referring more in detail to the drawings, 1 designates an element of a vehicle frame and 2, the axle.

3 designates a housing comprising a base 4 dished at its central portion and provided with a spacing disk 5 that bears against the face of the vehicle frame member 1 and is secured to the housing member by studs 6, the housing member further comprising a rim flange 7 for enclosing the operating elements hereinafter described.

Extending through an aperture 8 at the center of the housing base member 4 and through registering apertures in the spacing disk 5 and frame member 1 is the threaded shank 9 of an axle stud 10, the stud having an offset shoulder 11 bearing against the body of the housing base, and the shank carrying a nut 12 whereby the axle stud and housing may be securely attached to the frame member. Surrounding the stud 10 and held against rotation thereon by the attaching studs 6, is a friction brake disk 13.

Located within the housing 3 is a drum 14 comprising a hub 15 that is rotatable on the axle stud 10, a diaphragm 16 having its outer face in frictional contact with the fixed disk 13 to function as a friction brake member in co-operation with the disk 13, and a troughed rim 17 for seating a rebound check band 18 as presently described.

The end of the hub member 15 is cam grooved, and loosely mounted on the axle stud 10 is an actuator consisting of a collar 19 having a cam lobe 20 seating within the cam groove of the housing hub member so that when one of the cam members turns relative to the other, they will tend to spread longitudinally along the axle stud. The spread of the collar is resisted by an expansion spring 21 surrounding the axle stud and bearing against the end of the collar and against a washer 22 held on the stud by a nut 23 on the threaded shank 24 on the end of the stud. Surrounding both the hub member 15 and the collar 19 is a spiral or clock spring 25, the inner end of which is anchored to the stud 10 by a lip 26 which projects inwardly through a slot 19' in the collar 19 into a groove 27 in the stud, thereby not only anchoring the inner end of the spring, but also holding the collar against rotation on the stud while permitting longitudinal movement of the collar along the stud. The outer end of the recoil spring is fixed to the drum 14, preferably by means of a hook 28 on the end of the rebound check band 18 which seats in the trough-like rim of the housing 14 and extends through a slot 29 in the rim and through a registering groove 30 in the recoil spring. The opposite end of the band 18 is anchored to the axle 2 by a clasp 31 of any suitable construction.

The trough of the housing 14 is preferably formed by a flange 32 integral with one edge of the drum member and a flange 33 on a loose rim 34 which is adapted to slip over the rim 17 and serves to confine the spring in the housing as well as to hold the rebound check band within the trough. The outer face of the housing is closed by a cover plate 35, having a flange 36 fitting over the periphery of the housing rim and having a central dome 37 for enclosing the cam spring, the top of the dome having a central aperture 38 through which the axle stud 24 is projected, so that the top of the dome may be located between the nut 23 and the washer 22 to hold the cover member securely to the axle stud.

Assuming that the parts are constructed and assembled as described, the recoil and cam springs are put under a normal tension so that when the vehicle body is in its normal relation to the axle, there is a pull on the rebound check band, and the friction disk members 13 and 16 are in close contact, the collar 19 being slightly spread from its nesting relation with the hub 15 as indicated in Fig. 1. With the device in this condition, ordinary road shocks will cause the absorber springs to expand and contract and the cam members to shift on each other to relieve and exert pressure of the disk members on each other during the down and up movement of the body, the detailed action of the parts being as follows:

Assuming that an unevenness of the road is encountered, the body of the vehicle compresses the vehicle springs so that the frame member 1 approaches the axle 2. The absorber springs being normally under tension, expand upon the down movement of the body, the recoil spring rotating the drum in a direction to wind the rebound check band on the drum and take up any slack which the movement of the vehicle may occasion. This movement of the drum turns the cam end of the hub so that the lobe on the collar cam can be pushed inwardly by the expansion spring 21, thereby relieving pressure of the rotatable drum disk on the fixed disk that is attached to the housing. Immediately upon return movement of the vehicle under tension of its springs, the rebound check band pulls on the drum to rotate it against the tension of the recoil spring, this rotation of the drum turning the hub cam against the collar cam, forcing the collar cam against the tension of the compression spring, and the drum disk against the stationary disk. As rotation of the drum continues, movement of the collar cam is resisted by tension of the expansion spring and the drum disk is forced against the fixed disk with increasing pressure, the tension disks acting as a brake to retard rotation of the drum, and consequently, the upward movement of the vehicle.

It is apparent that as the cam shift is positive and gradual, pressure of the drum disk against the fixed disk is also positive and gradual, and that as the shift of the collar cam is against the tension of the expansion spring, increase of pressure of one of the brake disks against the other is also gradual until limit of compression of the expansion spring is reached, when the parts are positively held to prevent further rotation of the drum and upward movement of the vehicle body.

It is further apparent that the recoil spring, while primarily serving merely as a winding element for the rebound shock band, also serves to check the rebound until the pressure brake takes hold, the major part of the work, however, being done by the positively acting friction brake.

What we claim and desire to secure by Letters-Patent is:

1. A shock absorber comprising, in combination with fixed and rotatable brake disk members, an actuator in cam relation to the rotatable brake disk member, a recoil spring connected with the rotatable brake disk member, and means restraining the actuator, said means being yieldable to permit camming movement on the rotatable brake member.

2. In a shock absorber, a fixed friction brake member, a rotatable friction brake member comprising a cam element, a longitudinally movable cam member co-operative with the rotatable brake member, means yieldingly restraining said cam member, a recoil spring connected with the rotatable brake member and a rebound check band connected with said rotatable brake member.

3. A shock absorber comprising a drum housing, a friction disk fixed to said housing, an axle within the housing, a drum rotatable on said axle within the housing and having a friction disk member co-operating with the fixed disk member and having a cam-shaped hub, a collar slidable longitudinally on the axle member cam-shaped to co-operate with said cam-shaped hub, an expansion spring confined within the housing and yieldingly restraining said collar, a recoil spring anchored to the drum and to the axle, and a rebound check band connected to the drum.

4. A shock absorber comprising a housing, a friction disk fixed in the housing, an axle member fixed with relation to the housing and having a longitudinal spline groove, a drum having a cam-shaped hub portion rotatable on the axle and having a friction disk member co-operative with the fixed disk member, a recoil spring wound about the hub and collar having a lip splining the collar to the axle and anchoring the spring, the opposite end of the spring being attached to the drum, a retainer on the axle, an expansion spring confined between the collar and the retainer, and a rebound check band connected with the drum.

5. In combination with relatively movable members, a brake disk fixed on one of the members, a brake disk rotatably and laterally movable on said member and having a cam face, an actuator on said member having a cam face co-operative with the cam face on said rotatable brake disk, a recoil member connecting the rotatable brake disk with the other relatively movable member and resisting rotation of said brake disk in one direction and resilient means urging said cam faces into engagement whereby the rotatable brake disk is cammed toward the fixed brake disk upon rotation of said rotatable brake disk in the opposite direction.

6. In combination with relatively movable members, a brake disk fixed on one of the members, a brake disk rotatably and laterally movable on said member and having a cam face, an actuator longitudinally movable on said member, having a cam face co-operative with the cam face on said rotatable brake disk, an expansive spring yieldingly resisting axial movement of the actuator, whereby the rotatable brake disk is cammed toward the fixed brake disk upon rotation of said disk in one direction to resist movement thereof, and a coiled spring resisting rotation of said disk in the opposite direction.

In testimony whereof we affix our signatures.

WILLIAM H. FRY.
CHRISTOPHER W. GILDEA.